United States Patent
Li et al.

(10) Patent No.: US 8,576,716 B2
(45) Date of Patent: Nov. 5, 2013

(54) METHOD AND APPARATUS FOR DATA PROCESSING

(75) Inventors: Nan Li, Beijing (CN); Shuping Chen, Beijing (CN); Jing Han, Beijing (CN); Guangyi Liu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 472 days.

(21) Appl. No.: 12/920,866

(22) PCT Filed: Mar. 4, 2009

(86) PCT No.: PCT/CN2009/000231
§ 371 (c)(1),
(2), (4) Date: Sep. 3, 2010

(87) PCT Pub. No.: WO2009/109108
PCT Pub. Date: Sep. 11, 2009

(65) Prior Publication Data
US 2010/0329279 A1 Dec. 30, 2010

(30) Foreign Application Priority Data
Mar. 4, 2008 (CN) .......................... 2008 1 0101340

(51) Int. Cl.
*H04L 12/56* (2011.01)
(52) U.S. Cl.
USPC ......................................................... 370/235
(58) Field of Classification Search
None
See application file for complete search history.

(56) References Cited

U.S. PATENT DOCUMENTS

| 6,259,677 | B1 | 7/2001 | Jain | |
|---|---|---|---|---|
| 6,519,223 | B1 | 2/2003 | Wager et al. | |
| 7,260,120 | B2 * | 8/2007 | Kang et al. | 370/535 |
| 7,646,709 | B2 * | 1/2010 | Jeffries et al. | 370/229 |
| 8,046,486 | B2 * | 10/2011 | Amir et al. | 709/235 |
| 2005/0025194 | A1 | 2/2005 | Adjakple et al. | |
| 2006/0098574 | A1 * | 5/2006 | Yi et al. | 370/236 |
| 2006/0146831 | A1 | 7/2006 | Argyropoulos et al. | |
| 2007/0171853 | A1 | 7/2007 | Jones et al. | |
| 2008/0008096 | A1 | 1/2008 | Dhanapal et al. | |
| 2008/0095198 | A1 * | 4/2008 | Wager et al. | 370/519 |

FOREIGN PATENT DOCUMENTS

| CN | 1777126 | 5/2006 |
|---|---|---|
| CN | 101030925 | 9/2007 |
| CN | 101076015 | 11/2007 |
| JP | 07-079250 | 3/1995 |
| JP | 10-013472 | 1/1998 |
| JP | 2000-216814 | 8/2000 |
| JP | 2000-307602 | 11/2000 |
| JP | 2001-136196 | 5/2001 |
| JP | 2003-087317 | 3/2003 |
| KR | 10-2007-0028782 | 3/2007 |

* cited by examiner

*Primary Examiner* — Hassan Kizou
*Assistant Examiner* — Roberta A Shand
(74) *Attorney, Agent, or Firm* — Workman Nydegger

(57) ABSTRACT

A method for data processing is provided, the method comprises: determining the predicted transmission time required by the data packet to be transmitted currently during the transmission course and the residence time for the data packet residing in the buffer; when the sum of the predicted transmission time and the residence time is greater than the predetermined air interface time delay, discarding the data packet. By utilizing the technical scheme of the invention, the discarding time of the data packet is dynamically adjusted, the packet discarding rate is reduced, and the service quality is improved. An apparatus for data processing is also provided.

9 Claims, 2 Drawing Sheets

METHOD AND APPARATUS FOR DATA PROCESSING

CROSS REFERENCE TO RELATED APPLICATIONS

This application is a U.S. national stage of filing of International Application No. PCT/CN2009/00231, filed Mar. 4, 2009, claiming priority from Chinese Application No. 200810101340.8, filed Mar. 4, 2008, which are both incorporated herein by reference in their entirety.

FIELD OF THE INVENTION

The present invention relates to the field of communications, and particularly to a data processing method and device.

BACKGROUND OF THE INVENTION

It is very strict with delay requirement for bearing a real-time service in a packet domain in wireless communication. The delay is typically limited within a range from 80 to 150 ms for transmission of a data packet of a real-time voice service via an air interface and limited to approximately 300 ms for transmission of a data packet of a real-time video service via an air interface.

A transmission delay experienced by a data packet via an air interface generally includes two parts, i.e. a wait delay in a buffer of a transmitter side and a transmission delay during transmission. The wait delay generally depends upon a system congestion condition, and the transmission delay depends upon a transmitting capacity of an air interface channel and a capacity of a receiver side to process the received data packet, that is, the transmission delay includes a period of time required for transmission, reception, feedback and corresponding processing of the data packet.

Since it is very strict with delay requirement for a real-time service, if a data packet is subject to an excessively long wait delay in the buffer of the transmitter side, then the data packet may not contribute to a quality of service even though it is subsequently transmitted and correctly received, and on the contrary, a valuable resource of the air interface may be wasted, thus resulting in an increased wait delay of a subsequent data packet. In order to address this issue, a discard timer is provided at the transmitter side, and such a data packet that waits in the buffer of the transmitter side for a delay exceeding a packet discard threshold (i.e., the maximum wait delay) preset by the discard timer is discarded, to improve the efficiency of transmission via the resource of the air interface and reduce a wait delay of a subsequent data packet. The presetting of the packet discard threshold is of a significant influence on the packet loss rate and the transmission efficiency of the system, for example, a relatively small preset packet discard threshold may result in a relatively large packet loss rate; and a relatively large preset packet discard threshold may result in degraded transmission efficiency and an increased wait delay of a subsequent data packet. A method for presetting a packet discard threshold in the prior art lies in that: a period of time required for the largest number of transmissions via the air interface is reserved in the total delay of the air interface, that is, the packet discard threshold is determined as the difference between the total delay of the air interface and the period of time required for the largest number of transmissions via the air interface. For example, as illustrated in FIG. 1, $T_{budget}$ represents the total delay of the air interface, $N_{trans}$ represents the largest number of transmissions of the system, $T_{trans}$ represents a period of time for each transmission, and $T_{threshold}$ represents the packet discard threshold, accordingly, $T_{threshold}=T_{budget}-N_{trans}\times T_{trans}$. A data packet waiting in the buffer for a delay exceeding the packet discard threshold is discarded. Unfortunately in this method, a data packet can only be discarded prior to its first transmission, and the timer for the data packet is reset to zero upon commence of the first transmission.

In view of the above, the packet discard threshold preset in the foregoing method has the following disadvantages.

1. Since the period of time occupied for the largest number of transmissions allowable for the system has to be accommodated, the packet discard threshold may be preset excessively short. However, the majority of data packets can be received correctly prior to reaching the largest number of transmissions in a well designed wireless system. Thus, a relatively short period of time experienced by a data packet in the buffer to wait for a first transmission may cause some data packets that can be received correctly without being subject to the largest number of transmissions to be discarded prematurely, especially in the event of a relatively short total delay of the air interface and a relatively poor quality of the channel, and the packet loss rate at the transmitter side may consequently be increased dramatically, thus degrading greatly the quality of service.

For example, in the case that the total delay of the air interface is denoted as $T_{budget}$, where $T_{budget}=150$ ms, the largest number of transmissions of the system is denoted as $N_{trans}$, where $N_{trans}=4$, a period of time occupied for each round-trip transmission is denoted as $T_{RTT}$, where $T_{RTT}=20$ ms, and the packet discard threshold is denoted as $T_{threshold}$, then $T_{threshold}=150-4\times 20=70$ ms as preset in the foregoing method, that is, a data packet waiting in a buffer of a transmitter for its first transmission for a period of time exceeding 70 ms is to be discarded. Actually, the majority of data packets may be transmitted successfully without being subject to four times of transmissions, and some data packets may be transmitted successfully even during the first transmission, in this case, a data packet is still valid even if it is transmitted for the first time after waiting in the buffer for $150-1\times 20=130$ ms.

2. Presetting of a packet discard threshold is dependent upon the total delay of the air interface, the largest number of transmissions of the system and the period of time occupied for each round-trip transmission, and when these conditions remain unchanged, the same packet discard threshold is to be preset even for data packets of different users or different data packets of the same user. However, channel statuses of users vary, and this method for presetting a packet discard threshold can not enable a data packet to be discarded properly dependent upon a practical condition, thus possibly resulting in a relatively large packet loss rate and a relatively low utilization efficiency of the resource of the air interface.

3. Such a mechanism, in which a monitoring process of whether to discard a data packet is disabled after the first transmission of the data packet and it is assumed that an event of discarding the data packet will not occur during subsequent possible retransmission, may be unreasonable, because channel and system loads and hence a delay due to retransmission vary dynamically. If the sum of an actual transmission delay occupied for the first transmission and retransmission of a data packet and a wait delay occupied for the data packet exceeds the total delay of the air interface, it indicates that subsequent transmission of the data packet is useless and the data packet shall be discarded.

SUMMARY OF THE INVENTION

Embodiments of the invention provide a data processing method and device to address the disadvantages of an increased packet loss rate or a degraded transmission efficiency due to an unreasonably preset packet loss threshold in the prior art.

An embodiment of the invention provides a data processing method including:

determining a predicated transmission period of time required for transmitting a data packet and a stay period of time during which the data packet stays in a buffer; and discarding the data packet when the sum of the predicated transmission period of time and the stay period of time exceeds a preset delay of an air interface.

An embodiment of the invention provides a data processing device including:

a predicated transmission period of time determination module configured to determine a predicated transmission period of time required for transmitting a data packet for transmission;

a stay period of time determination module configured to determine a stay period of time during which the data packet stays in a buffer;

a calculation module configured to calculate the sum of the predicated transmission period of time and the stay period of time; and a processing module configured to discard the data packet when a result of the calculating indicates that the sum of the predicated transmission period of time and the stay period of time exceeds a preset delay of an air interface.

Embodiments of the invention adjust dynamically the time when a data packet for transmission is to be discarded by taking into account both a predicated transmission period of time for transmitting the data packet and a stay period of time during which the data packet stays in a buffer, to thereby reduce a packet loss rate and improve a quality of service.

DETAILED DESCRIPTION OF THE EMBODIMENTS

In order to attain an object of the invention, in the case of a service with strict delay requirement (e.g., a Voice over Internet Protocol (VoIP) service), times for packet discarding are determined dynamically for data packets of different users or different data packets of the same user, to make a packet discard mechanism more reasonable.

Respective embodiments of the invention are detailed hereinafter in connection with the drawings.

Figure 1:
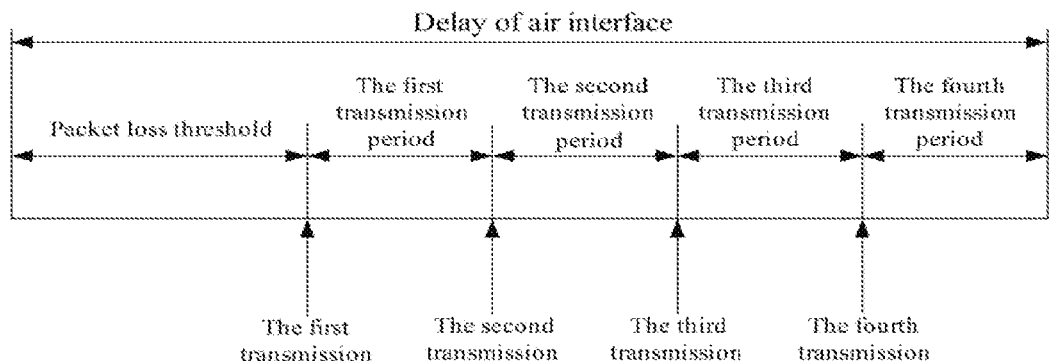
FIG. 1 is a schematic diagram of determining a packet discard threshold in the prior art.
Figure 2:
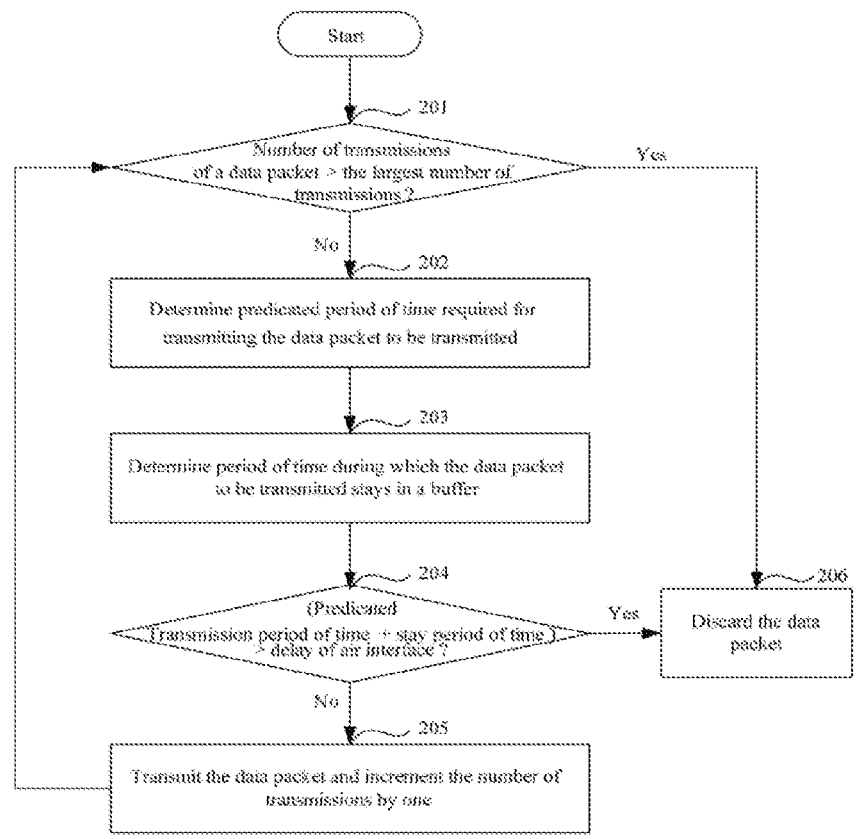
FIG. 2 is a schematic flow diagram of a method for transmitting a data packet according to a first embodiment of the invention.

Reference is made to FIG. 2 which illustrates a schematic flow diagram of a method for transmitting a data packet according to a first embodiment of the invention, and as may be apparent from FIG. 2, this method includes the following operations 201 to 206.

Operation 201: it is determined whether a data packet for transmission has been subject to a number of transmissions more than the largest number of transmissions, and if so, then the operation 206 is executed; otherwise, the operation 202 is executed.

The largest number of transmissions in the present embodiment may be determined from a parameter of a transmission system per se or empirically, but the invention is not limited in this respect.

The data packet for transmission may be a data packet arranged in the first place of a buffer.

Operation 202: a predicated transmission period of time required for transmitting the data packet for transmission is determined.

In the present embodiment, the predicated transmission period of time may be determined empirically or from a parameter such as a channel status. A period of time for transmission of a data packet includes but not limited to the following two definitions.

1. A period of time for transmission of a data packet=A period of time for the data packet to travel from a transmitter side to a receiver side+a period of time occupied for the receiver side to process the data packet.

2. A period of time for transmission of a data packet=A period of time for the data packet to travel from a transmitter side to a receiver side+a period of time occupied for the receiver side to process the data packet+a transmission period of time occupied for the receiver side to transmit feedback information to the transmitter side and the feedback information to reach the transmitter side+a period of time for the transmitter side to process the received feedback information.

(1) The predicated transmission period of time of the data packet for transmission may be determined from a transmission period of time of any previously transmitted data packet:

the predicated transmission period of time=a period of time for the any data packet to travel from the transmitter side to the receiver side+a period of time occupied for the receiver side to process the any data packet; or the predicated transmission period of time=a period of time for the any data packet to travel from the transmitter side to the receiver side+a period of time occupied for the receiver side to process the any data packet+a transmission period of time occupied for the receiver side to transmit feedback information to the transmitter side and the feedback information to reach the transmitter side+a period of time for the transmitter side to process the received feedback information.

(2) The predicated transmission period of time of the data packet for transmission may be determined from an average of transmission periods of time occupied for N previously transmitted data packets, where N is an integer larger than one. Description of a specific determination process thereof is omitted here.

Operation 203: a stay period of time during which the data packet for transmission stays in a buffer is determined.

If the data packet is to be transmitted for the first time, then:

the stay period of time during which the data packet stays in the buffer=a period of time during which the data packet waits for the first transmission in the buffer.

If the data packet has been transmitted for M (M is larger than 1) times, then:

the stay period of time during which the data packet stays in the buffer=a period of time during which the data packet waits for the first transmission in the buffer+a period of time for the data packet to wait for being scheduled+the sum of round-trip transmission periods of time occupied for the M times of performed transmission processes.

Particularly, the period of time for the data packet in waiting for being scheduled=the sum of periods of time from the ending of the former of every two adjacent round-trip transmissions to the starting of the latter of the two adjacent round-trip transmissions among the M round-trip transmission processes and the ongoing round-trip transmission process.

Here, the round-trip transmission period of time occupied for each performed transmission process=the period of time for the data packet to travel from the transmitter side to the receiver side+the period of time occupied for the receiver side to process the received data packet+the period of time occupied for the receiver side to transmit feedback information+the period of time for the transmitter side to process the feedback information.

Operation 204: it is determined whether the sum of the predicated transmission period of time and the stay period of time during which the data packet stays in the buffer exceeds a system-tolerable delay of an air interface, and if so, then the operation 206 is executed; otherwise, the operation 205 is executed.

In the present embodiment, the operations 202 and 203 can be executed in a variable order.

Operation 205: the data packet is transmitted with the number of transmissions being incremented by one. If this transmission fails and the data packet is to be retransmitted, then the operation 201 is executed.

Operation 206: the data packet is discarded.

The method according to the first embodiment is explained in detailed hereinafter in connection with a specific example of a second embodiment.

In the second embodiment of the invention, a system-tolerable delay of an air interface $T_{budget}$ is 80 ms, the largest number of transmissions is four (the largest number of retransmissions is three), and a period of time for transmission of a data packet is determined as the sum of a period of time for the data packet to travel from a transmitter side to a receiver side and a period of time occupied for the receiver side to process the data packet, then a data packet is processed at the transmitter side in the following method.

In the first operation, when the data packet is to be transmitted for the first time, a stay period of time during which the data packet stays in a buffer is determined as a period of time $T_0$ during which the data packet waits for the first transmission in the buffer, where $T_0=20$ ms, and a predicated period of time for the first transmission of the data packet $T_{trans_1\_estimate}$ is determined, where $T_{trans_1\_estimate}=5$ ms. Thus, $T_{trans_1\_estimate}+T_0=20$ ms$<T_{budget}$, and the data packet is transmitted normally.

In the second operation, if the transmitter side receives and processes feedback information of a transmission failure after elapsing of a 12 ms delay (i.e., a round-trip transmission period of time $T_{RTT_1}$ occupied for the first transmission, where $T_{RTT_1}=12$ ms), then the data packet is queued for the next transmission.

In the third operation, if the data packet is to be retransmitted, and a period of time during which the data packet waits in the buffer since the first round-trip transmission ends until the second round-trip transmission is initiated is denoted as $T_{wait_1}$, where $T_{wait_1}=20$ ms, then the stay period of time during which the data packet stays in the buffer may be drawn as $T_0+T_{wait_1}+T_{RTT_1}=52$ ms; a predicated period of time for the second transmission of the data packet $T_{trans_2\_estimate}$ is determined, where $T_{trans_2\_estimate}=5$ ms. Due to the fact that $T_0+T_{wait_1}+T_{RTT_1}+T_{trans_2\_estimate}=57$ ms$<T_{budget}$, the data packet is transmitted normally.

In the fourth operation, if the transmitter side receives and processes feedback information of a transmission failure after elapsing of a 11 ms delay (i.e., a round-trip transmission period of time $T_{RTT_2}$ occupied for the second transmission, where $T_{RTT_2}=11$ ms), then the data packet is queued for the next transmission.

In the fifth operation, if the data packet is to be retransmitted, and a period of time during which the data packet waits in the buffer since the second round-trip transmission ends until the third round-trip transmission is initiated is denoted as $T_{wait_2}$, where $T_{wait_2}=10$ ms, then in analogy to the third operation, the stay period of time during which the data packet stays in the buffer may be drawn as $T_0+T_{wait_1}+T_{RTT_1}+T_{wait_2}+T_{RTT_2}=73$ ms; a predicated period of time for the third transmission of the data packet $T_{trans_3\_estimate}$ is determined, where $T_{trans_3\_estimate}=5$ ms. Due to the fact that $T_0+T_{wait_1}+T_{RTT_1}+T_{wait_2}+T_{RTT_2}+T_{trans_3\_estimate}=78$ ms$<T_{budget}$, the data packet is transmitted normally.

In the sixth operation, the total stay period of time during which the data packet stays in the buffer may be drawn as $T_0+T_{wait_1}+T_{RTT_1}+T_{wait_2}+T_{RTT_2}+T_{RTT_3}=84$ ms$>T_{budget}$ after elapsing of a 11 ms delay again (i.e., a round-trip transmission period of time $T_{RTT_3}$ occupied for the third transmission, where $T_{RTT_3}=11$ ms), and the data packet is discarded when it is arranged in the first place of the buffer again, regardless of whether the third transmission succeeds or fails.

In the present second embodiment, if it a period of time for transmission of a data packet is equal to a period of time for the data packet to travel from a transmitter side to a receiver side+a period of time occupied for the receiver side to process the data packet+a transmission period of time occupied for the receiver side to transmit feedback information to the transmitter side and the feedback information to reach the transmitter side+a period of time for the transmitter side to process the received feedback information, then in the foregoing fifth operation, the determined predicated period of time for the third transmission of the data packet may possibly be drawn as $T_{trans_3\_estimate}=11$ ms, and in this case, the third transmission is not performed any longer and the data packet is discarded directly due to the fact that $T_0+T_{wait_1}+T_{RTT_1}+T_{wait_2}+T_{RTT_2}+T_{trans_3\_estimate}=84$ ms$>T_{budget}$.

In view of the above operations, if a data packet is to be transmitted, the sum of a stay period of time at the transmitter side and a predicated transmission period of time of the data packet may be denoted with formula (1) suitable for that the data packet is to be transmitted for the first time, and formula (2) suitable for that the data packet is to be retransmitted, $$T = T_0 + T_{trans\_estimate} \quad (1)$$

$$T = T_0 + \sum_{i=1}^{M} T_{wait_i} + \sum_{i=1}^{M} T_{RTT_i} + T_{trans\_estimate} \quad (2)$$

T denotes the sum of the wait period of time occupied for the data packet and the predicated transmission period of time thereof, $T_0$ denotes the period of time during which the data packet waits for the first transmission in the buffer, $T_{trans\_estimate}$ denotes the predicated transmission time required for the ongoing transmission of the data packet, $$\sum_{i=1}^{M} T_{wait_i}$$

denotes the sum of periods of time for the data packet in waiting for being scheduled from the ending of the former of every two adjacent round-trip transmissions to the starting of the latter of the two adjacent round-trip transmissions among performed round-trip transmission processes and the ongoing round-trip transmission process (M denotes the number of times that the data packet has been transmitted); and $$\sum_{i=1}^{M} T_{RTT_i}$$

denotes the sum of round-trip transmission periods of time occupied for respective transmissions (the round-trip transmission period of time is equal to a sum of a period of time for transmission of the data packet from the transmitter side to the receiver side, a period of time occupied for the receiver side to process the data packet, a period of time occupied for the receiver side to transmit feedback information and a period of time for the transmitter side to process the feedback information).

Figure 3:
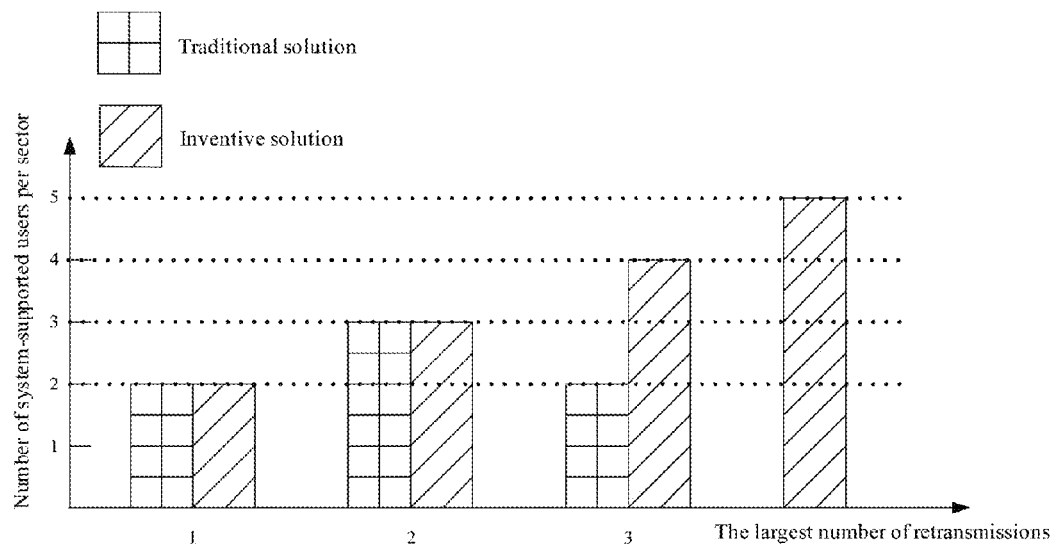
FIG. 3 is a schematic diagram of a simulation result of a solution according to an embodiment of the invention.

The method according to an embodiment of the invention may be applied in a simulation experiment, for example, in a system of Time Division duplex-Synchronous Code Division Multiple Access High Speed Uplink Packet Access (TD-SCDMA HSUPA), and for a VoIP service in use, where the maximum delay of an air interface tolerable to the system is 80 ms, a round-trip transmission period of time is 15 ms, and the largest number of transmissions of the system is four (i.e., the number of retransmissions is three), in this case a simulation result is as illustrated schematically in FIG. 3. As may be apparent from FIG. 3, in the event of a traditional solution using the largest number of retransmissions of three, a reserved period of time required for the largest number of transmissions is 60 ms, and the remaining 20 ms is taken as a packet discard threshold, therefore this solution can support at most only three users per sector. In contrast, the solution in the present embodiment eliminates the need of reserving a period of time required for the largest number of transmissions and can enable flexible control in response to an actual network status to support at most five users per sector, thereby improving a capacity of the system by 66%.

Figure 4:
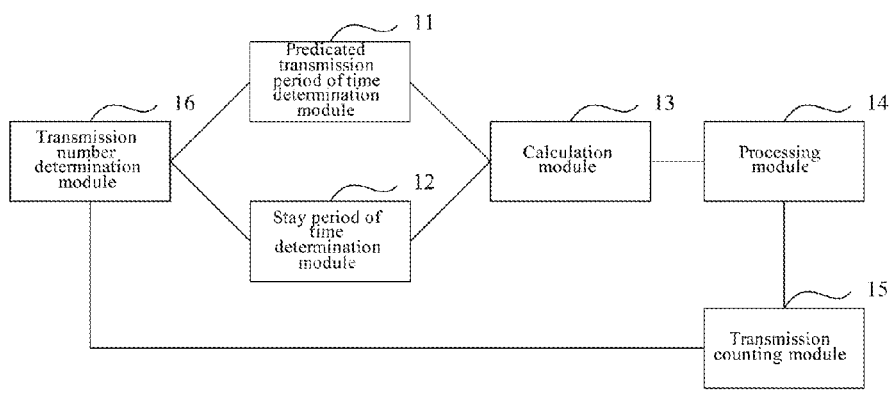
FIG. 4 is a schematic diagram of a structure of a data processing device according to a third embodiment of the invention.

A third embodiment of the invention provides a data processing device corresponding to the data processing method in the first embodiment with a structure as illustrated schematically in FIG. 4, which includes a predicated transmission period of time determination module 11, a stay period of time determination module 12, a calculation module 13 and a processing module 14, where the predicated transmission period of time determination module 11 is configured to determine a predicated transmission period of time required for transmitting a data packet for transmission; the stay period of time determination module 12 is configured to determine a stay period of time during which the data packet for transmission stays in a buffer; the calculation module 13 is configured to calculate the sum of the predicated transmission period of time and the stay period of time; and the processing module 14 is configured to discard the data packet when a result of the calculating indicates that the sum of the predicated transmission period of time and the stay period of time exceeds a preset delay of an air interface.

Moreover, the processing module 14 may further be configured to transmit the data packet when a result of the calculating indicates that the sum of the predicated transmission period of time and the stay period of time does not exceed the preset delay of an air interface.

Moreover, the device further includes a transmission counting module 15 configured to increment a recorded number of transmissions of the data packet by one after the processing module 14 has transmitted the data packet.

The device further includes a transmission number determination module 16 configured to trigger the predicated transmission period of time determination module 11 and the stay period of time determination module 12 upon determining that the number of transmissions of the data packet for transmission does not exceed the largest number of transmissions.

With the method and device according to the embodiments of the invention, times for packet discarding for data packets of different users and different data packets of the same user can be adjusted dynamically in response to an actual condition of a transmission system to make full use of a service delay budget, reduce a packet loss rate in a buffer at a transmitter side, improve a quality of service, as well as improve the capacity of the system in which a service with a strict delay requirement is borne. Moreover, when an embodiment of the invention is applied in a system of a High Speed Downlink Packet Access (HSDPA), a protocol of the system is subject to minor modifications, and good performance of the system can be achieved with simple operations in the event that the system operates normally.

Evidently, those skilled in the art can make various modifications and variations to the invention without departing from the scope of the invention. Thus, the invention is also intended to encompass these modifications and variations of the invention provided these modifications and variations come into the scope of the appended claims and their technical equivalents.

The invention claimed is:

1. A data processing method, comprising:
   determining a predicated transmission period of time required for transmitting a data packet for transmission and a stay period of time during which the data packet stays in a buffer; and
   discarding the data packet when the sum of the predicated transmission period of time and the stay period of time exceeds a preset delay of an air interface; or
   transmitting the data packet and incrementing a recorded number of transmissions of the data packet by one when the sum of the predicated transmission period of time and the stay period of time does not exceed the preset delay of the air interface;
   wherein before determining the predicated transmission period of time and the stay period of time, the method further comprises:
   determining whether the data packet has been transmitted with a number of transmissions exceeding a largest number of transmissions.

2. The method of claim 1, wherein, the predicated transmission period of time is determined from a period of time for transmission of any previously transmitted data packet.

3. The method of claim 2, wherein, the period of time for transmission of a data packet is a period of time for the data packet to travel from a transmitter side to a receiver side plus a period of time occupied for the receiver side to process the data packet.

4. The method of claim 2, wherein, the period of time for transmission of a data packet is a sum of a period of time for the data packet to travel from the transmitter side to the receiver side, a period of time occupied for the receiver side to process the data packet, a transmission period of time occupied for the receiver side to transmit feedback information to the transmitter side and the feedback information reaches the transmitter side, and a period of time for the transmitter side to process the received feedback information.

5. The method of claim 1, wherein, when the data packet is to be transmitted for the first time, the stay period of time is a period of time during which the data packet waits in the buffer prior to a first transmission.

6. The method of claim 1, wherein, when the data packet is to be transmitted for other than the first time, the stay period of time is a sum of a period of time during which the data packet waits in the buffer prior to a first transmission, a period of time for the data packet in waiting for being scheduled, and round-trip transmission periods of time occupied for performed transmissions; and wherein, the period of time for the data packet in waiting for being scheduled is a period of time from the ending of the former of every two adjacent round-trip transmissions to the starting of the latter of the two adjacent round-trip transmissions among performed round-trip transmission processes and an ongoing round-trip transmission process.

7. The method of claim 1, wherein, the predicated transmission period of time is determined from an average of transmission periods of time of N data packets previously transmitted, wherein N is an integer larger than one.

8. The method of claim 7, wherein, the period of time for transmission of a data packet is a period of time for the data packet to travel from a transmitter side to a receiver side plus a period of time occupied for the receiver side to process the data packet.

9. The method of claim 7, wherein, the period of time for transmission of a data packet is a sum of a period of time for the data packet to travel from the transmitter side to the receiver side, a period of time occupied for the receiver side to process the data packet, a transmission period of time occupied for the receiver side to transmit feedback information to the transmitter side and the feedback information reaches the transmitter side, and a period of time for the transmitter side to process the received feedback information.

* * * * *